US012781912B2

(12) United States Patent
Iacovoni et al.

(10) Patent No.: US 12,781,912 B2
(45) Date of Patent: Nov. 3, 2026

(54) CART ASSEMBLY

(71) Applicant: Steelcase Inc., Grand Rapids, MI (US)

(72) Inventors: Joseph Iacovoni, Caledonia, MI (US); Giorgio Verduzio, Grand Rapids, MI (US); Yuka Hiyoshi, Grand Rapids, MI (US); Peter Emmett Mack, II, Holland, MI (US); Mark McKenna, East Grand Rapids, MI (US); Sara Dal Gallo, To (IT); Guido Cherici, To (IT)

(73) Assignee: Steelcase Inc., Grand Rapids, MI (US)

( * ) Notice: Subject to any disclaimer, the term of this patent is extended or adjusted under 35 U.S.C. 154(b) by 262 days.

(21) Appl. No.: 18/629,053

(22) Filed: Apr. 8, 2024

(65) Prior Publication Data

US 2024/0326889 A1 Oct. 3, 2024

Related U.S. Application Data

(63) Continuation of application No. PCT/US2022/046145, filed on Oct. 10, 2022.

(60) Provisional application No. 63/270,275, filed on Oct. 21, 2021.

(51) Int. Cl.

| | |
|---|---|
| ***F16M 11/22*** | (2006.01) |
| ***B62B 3/04*** | (2006.01) |
| ***B62B 3/10*** | (2006.01) |
| ***F16M 11/42*** | (2006.01) |

(52) U.S. Cl.

CPC ............... *F16M 11/22* (2013.01); *B62B 3/04* (2013.01); *B62B 3/108* (2013.01); *F16M 11/42* (2013.01); *B62B 2202/56* (2013.01)

(58) Field of Classification Search

CPC ........ F16M 11/10; F16M 11/22; F16M 11/42; B62B 3/04; B62B 3/108; B62B 2202/56

See application file for complete search history.

(56) References Cited

U.S. PATENT DOCUMENTS

| | | | | |
|---|---|---|---|---|
| 2,058,397 | A | 10/1936 | Baker | |
| 2,143,235 | A | 1/1939 | Bassett | |
| D300,150 | S * | 3/1989 | Ishii | D18/39 |
| 5,941,713 | A | 8/1999 | Wayner et al. | |
| 7,261,261 | B2 | 8/2007 | Ligertwood | |

(Continued)

FOREIGN PATENT DOCUMENTS

| | | | |
|---|---|---|---|
| CN | 101312074 | A | 11/2008 |
| CN | 201964107 | U | 9/2011 |

(Continued)

OTHER PUBLICATIONS

Steelcase Flex Media Cart; https://www.steelcase.com/products/carts/steelcase-flex-media-cart/?drawer_main=images&drawer_sub=on-white.*

(Continued)

*Primary Examiner* — Adam D Rogers

(74) *Attorney, Agent, or Firm* — Benesch Friedlander Coplan & Aronoff LLP

(57) ABSTRACT

A cart assembly includes a front frame, a rear frame, and an upper frame. The rear frame extends toward the front frame at a first angle relative to a vertical plane. The upper frame is connected between an upper end of the front frame and a portion of the rear frame. An upper free end of the rear frame is cantilevered over the upper frame and supports a mounting member configured to support a display.

19 Claims, 14 Drawing Sheets

(56) References Cited

U.S. PATENT DOCUMENTS

| | | | | |
|---|---|---|---|---|
| 7,530,538 | B2 | 5/2009 | Whalen et al. | |
| 9,894,988 | B2 * | 2/2018 | Olander | F16M 11/10 |
| 9,968,187 | B2 | 5/2018 | Udagawa et al. | |
| 10,328,748 | B1 * | 6/2019 | Kim | B60B 33/0015 |
| D864,625 | S | 10/2019 | Rockwell et al. | |
| 10,742,067 | B2 | 8/2020 | Ren et al. | |
| D914,654 | S * | 3/2021 | Pei | D14/239 |
| D915,363 | S * | 4/2021 | Pei | D14/239 |
| 11,421,815 | B2 * | 8/2022 | Yamada | F16M 11/105 |
| 12,000,530 | B2 * | 6/2024 | Zabelin | G06F 1/1601 |
| 12,085,226 | B2 * | 9/2024 | Tao | F16M 11/046 |
| D1,070,431 | S * | 4/2025 | Tao | D14/451 |
| D1,085,097 | S * | 7/2025 | Iacovoni | D14/239 |
| 2005/0230573 | A1 | 10/2005 | Ligertwood | |
| 2007/0001413 | A1 | 1/2007 | Rossini | |
| 2010/0126394 | A1 | 5/2010 | Burak et al. | |
| 2010/0289236 | A1 | 11/2010 | Bennett et al. | |
| 2012/0261362 | A1 * | 10/2012 | Skull | F16M 11/22<br>248/225.11 |
| 2016/0293067 | A1 | 10/2016 | Zaccai et al. | |
| 2016/0345729 | A1 | 12/2016 | Udagawa et al. | |
| 2017/0304020 | A1 | 10/2017 | Ng et al. | |
| 2018/0192875 | A1 | 7/2018 | Sommer et al. | |
| 2020/0091762 | A1 | 3/2020 | Ren et al. | |
| 2020/0245488 | A1 | 7/2020 | Iacovoni et al. | |

FOREIGN PATENT DOCUMENTS

| | | | | | |
|---|---|---|---|---|---|
| CN | 202338750 | U | | 7/2012 | |
| CN | 102 996 986 | A | | 3/2013 | |
| CN | 105508838 | A | | 4/2016 | |
| CN | 105 840 967 | A | | 8/2016 | |
| CN | 106555919 | A | | 4/2017 | |
| CN | 206958523 | U | | 2/2018 | |
| CN | 209 804 245 | U | | 12/2019 | |
| CN | 111 022 873 | A | | 4/2020 | |
| CN | 111623197 | A | * | 9/2020 | F16M 11/04 |
| CN | 211 925 275 | U | | 11/2020 | |
| CN | 212080606 | U | | 12/2020 | |
| CN | 213 236 692 | U | | 5/2021 | |
| CN | 115214756 | A | * | 10/2022 | B62B 3/02 |
| WO | WO-2010102344 | A1 | * | 9/2010 | F16M 11/10 |

OTHER PUBLICATIONS

Machine translation of CN 105508838 A obtained on Feb. 24, 2026.*

Machine translation of CN 111022873 A obtained on Feb. 24, 2026.*

PCT International Search Report and Written Opinion regarding PCT/US2022/046145 dated Jan. 19, 2023, 2 pages.

Anywhere Cart Display Stand Up to 86 Screen Support-Office Depot, 2 pages.

NewStar NS-M1500—Cart for LCD display/AV system, 2 pages.

LED LCD TV Portable Wheel Stand for presentations, 9 pages.

One Cart Update, Nov. 6, 2020, 45 pages.

TV Mobile Bracket Conference Room LCD Monitor Lift Floor Large Screen Display Bracket Cart, 10 pages.

* cited by examiner

CART ASSEMBLY

CROSS-REFERENCE TO RELATED APPLICATIONS

This application is a continuation of International Application PCT/US2022/046145, with an international filing date of Oct. 10, 2022, which claims the benefit of U.S. Provisional Application No. 63/270,275, filed Oct. 21, 2021, the entire disclosure of which is hereby fully incorporated by reference herein.

TECHNICAL FIELD

The present disclosure relates generally to a cart assembly configured for supporting one or more displays.

BACKGROUND

In some environments, it may be desirable to make an electronic visual display portable and/or to arrange one or more displays in a particular position to present various forms of content for various purposes, including but not limited to, remote conference calls.

SUMMARY

The present invention is defined by the following claims, and nothing in this section should be considered to be a limitation on those claims.

In one aspect, an embodiment of a cart assembly includes a front frame; a rear frame extending toward the front frame at an acute angle relative to a vertical plane; and an upper frame connected between an upper end of the front frame and a portion of the rear frame, where an upper free end of the rear frame is cantilevered over the upper frame and supports a mounting member configured to support a display. In one embodiment, the acute angle is between 5 and 45 degrees.

In another aspect, an embodiment of a cart assembly includes a base including spaced apart floor engaging members; a frame extending upwardly from the base at a first angle relative to a vertical plane, where the first angle is between 5 and 45 degrees, where the frame includes a free end disposed above the base between the spaced apart floor engaging members; and a mounting member coupled to the free end of the frame and configured to support a display.

In another aspect, an embodiment of a cart assembly includes a front frame; a rear frame extending toward the front frame at an acute angle relative to a vertical plane, and where the rear frame comprises an upper free end; an upper frame connected between an upper end of the front frame and a portion of the rear frame spaced below the upper free end, where the upper free end of the rear frame is cantilevered over the upper frame; a first mounting member coupled to the upper free end of the rear frame, where the first mounting member is configured to support a first display; and a second mounting member coupled to the front frame, where the second mounting member is configured to support a second display.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

DETAILED DESCRIPTION

It should be understood that the term "plurality," as used herein, means two or more. The term "coupled" means connected to or engaged with whether directly or indirectly, for example with an intervening member, and does not require the engagement to be fixed or permanent, although it may be fixed or permanent (or integral), and includes both mechanical and electrical connection. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first display may be the same as a second display, with each simply being applicable to separate but identical components.

Figure 1:
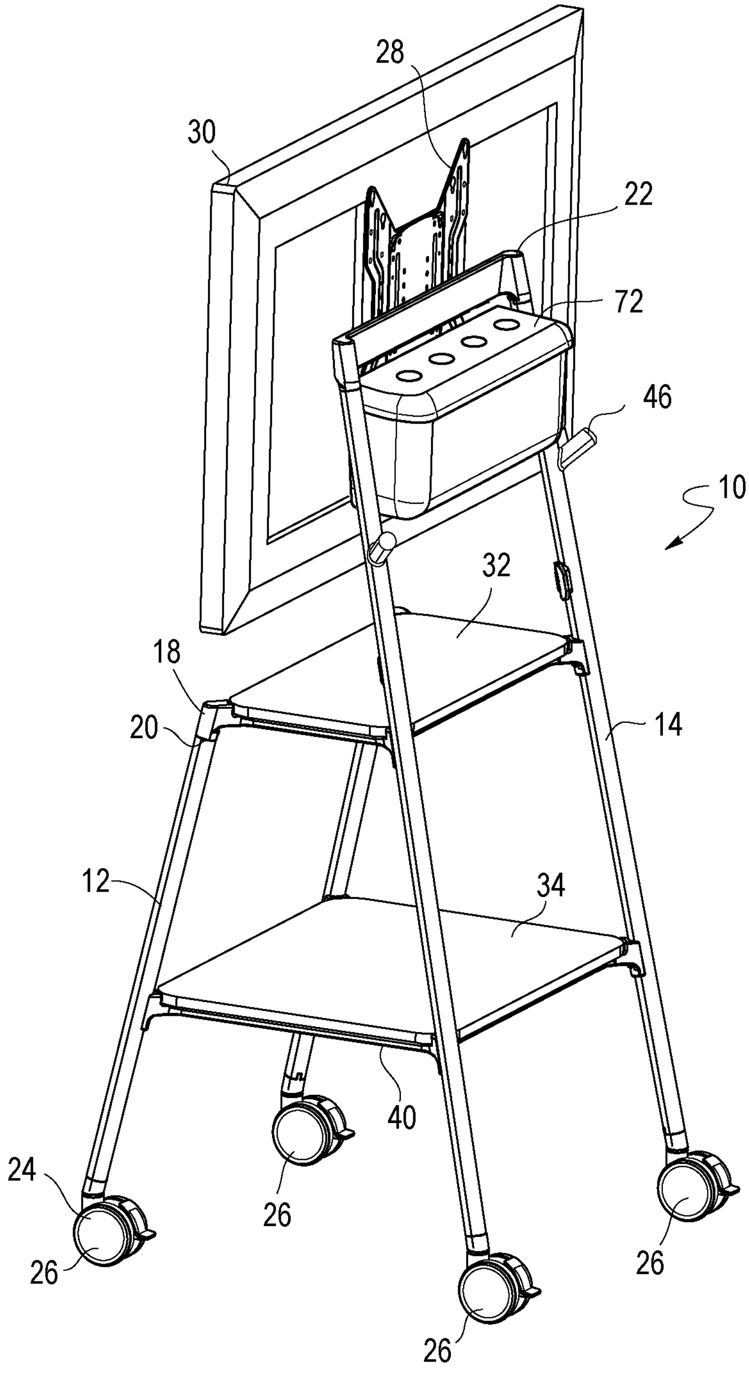
FIG. 1 is a perspective view of an embodiment of a cart assembly supporting a first display and two shelf units, showing a basket coupled to the cart assembly behind the first display.
Figure 2:
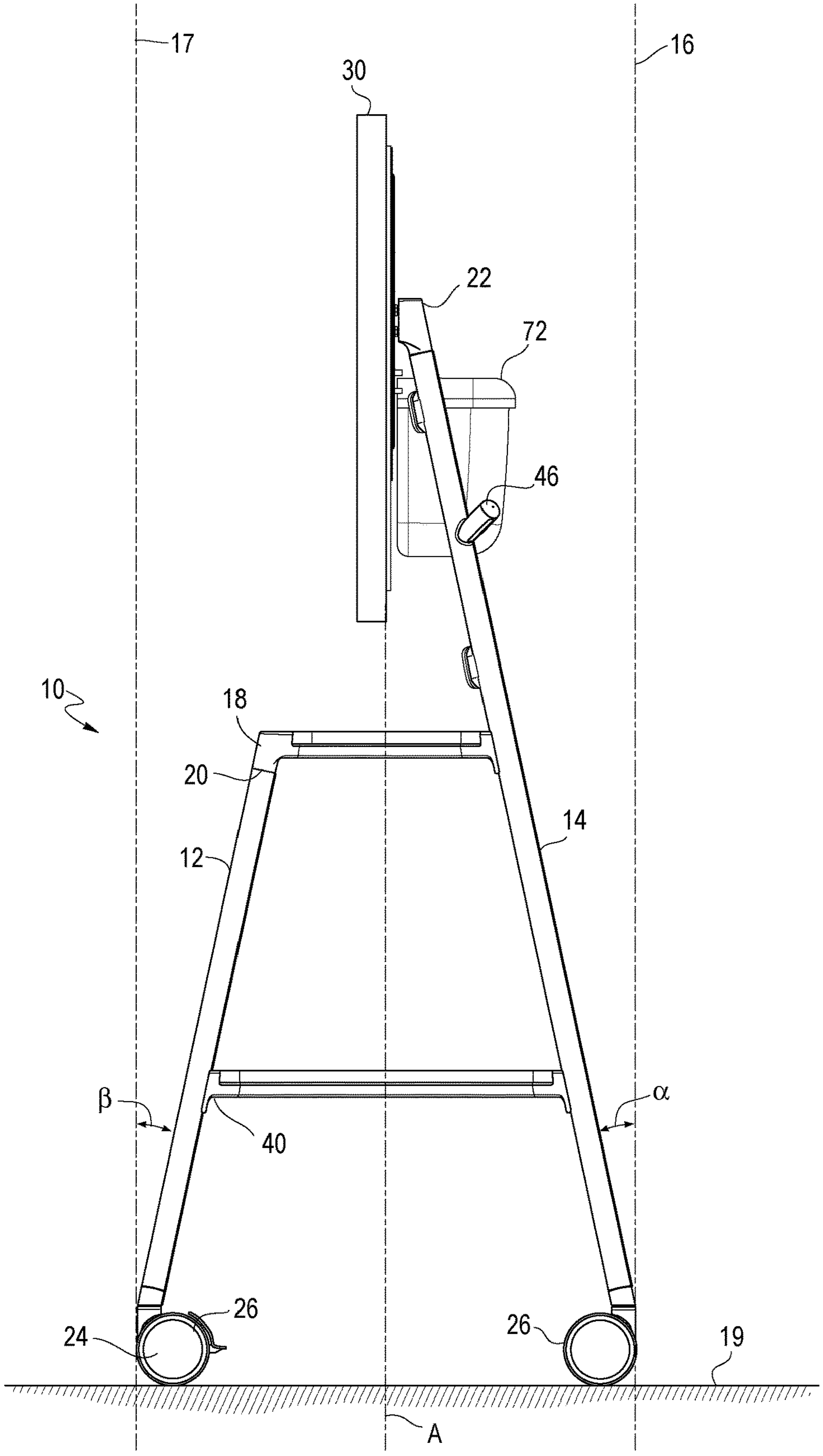
FIG. 2 is a side perspective view of the cart assembly of FIG. 1 supporting the first display.
Figure 3:
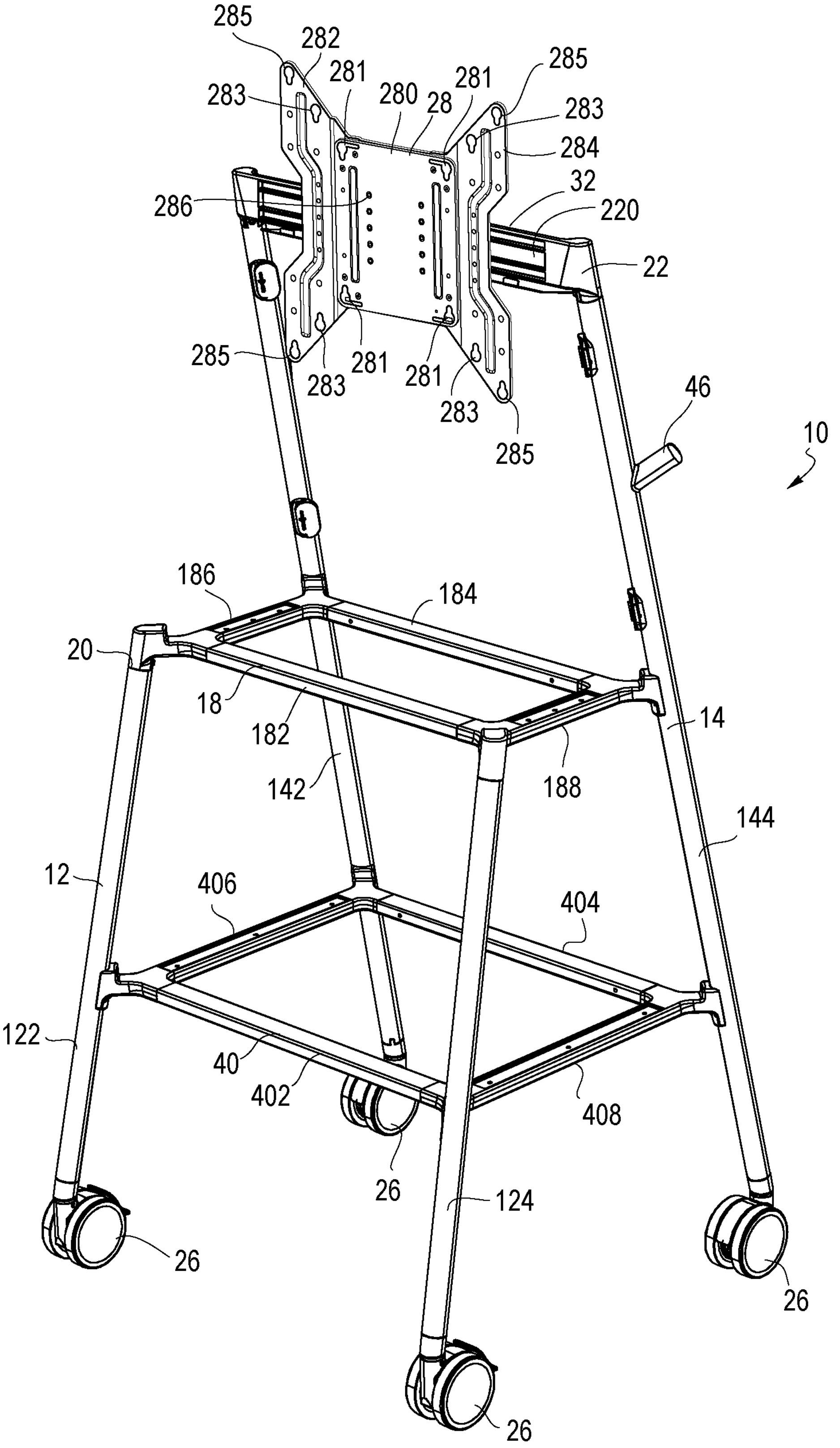
FIG. 3 is another perspective view of the cart assembly of FIG. 1 with the display and two shelf units removed.

Referring to FIGS. 1-3, an embodiment of a cart assembly 10 is shown. It should be understood that FIGS. 1-16 provide illustrations of a number of embodiments of ornamental design appearances of a number of embodiments of the cart assembly 10, and that various embodiments of the cart assembly 10 with different and other ornamental appearances may serve the same functions as the disclosed embodiments. The cart assembly 10 includes a front frame 12 and a rear frame 14. The term "frame" refers to a supporting structure, whether made of multiple components or monolithic. The front and rear frames 12 and 14 may be made of steel/metal, wood, plastic, composite material, or combinations thereof. The rear frame 14 extends toward the front frame 12 at a first acute angle α relative to a first vertical plane 16, where the first angle α is between 5 and 45 degrees, for example 12 degrees. The front frame 12 extends toward the rear frame 14 at a second acute angle β relative to a second vertical plane 17 that is parallel to the first vertical plane 16, where the second angle β may be between 5 and 45 degrees, for example 12 degrees. The cart assembly 10 may also include an upper frame 18 connected between an upper end 20 of the front frame 12 and a portion of the rear frame 14 spaced below an upper free end 22 of the rear frame 14. The term "free end" means that the upper end 22 of the rear frame 14 at least is not coupled to the upper end 20 of the front frame 12, and is not attached to any other frame component in one embodiment. As shown in FIG. 2, the upper end 22 is positioned along a mount axis A between front and rear floor engaging members 26 when projected to a floor 19, or put another way mount axis A is generally parallel to and laterally spaced between the pair of vertical planes 16 and 17 extending upwardly from the floor engaging members 26. In various embodiments, the mount axis A is approximately spaced equidistant from the vertical planes 16 and 17. The upper frame 18 may be configured to support various storage options, as discussed in greater detail below, and has a horizontal orientation in one embodiment. As shown in FIGS. 1-3, the upper free end 22 of the rear frame 14 is cantilevered over the upper frame 18.

Figure 4:
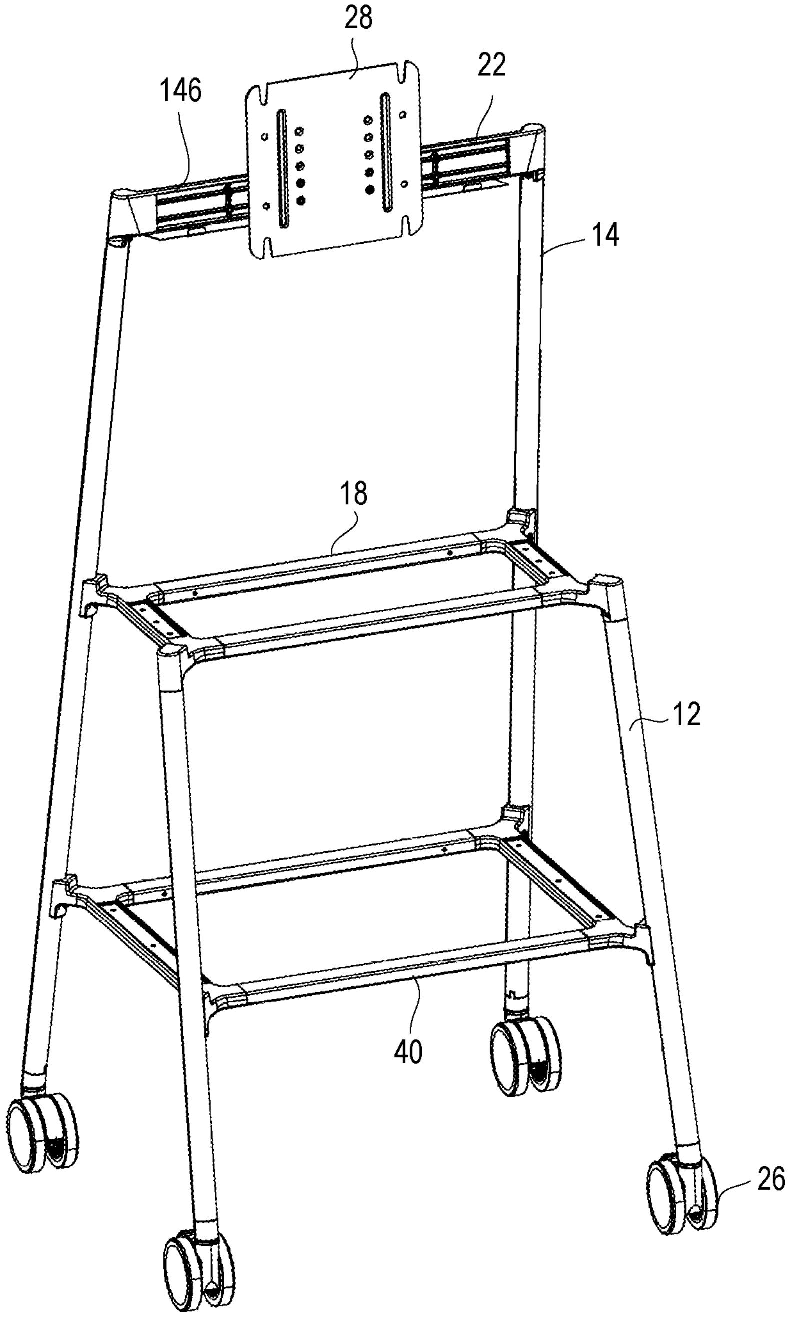
FIG. 4 is a perspective view of another embodiment of a cart assembly without supporting a display or shelf units.
Figure 5:
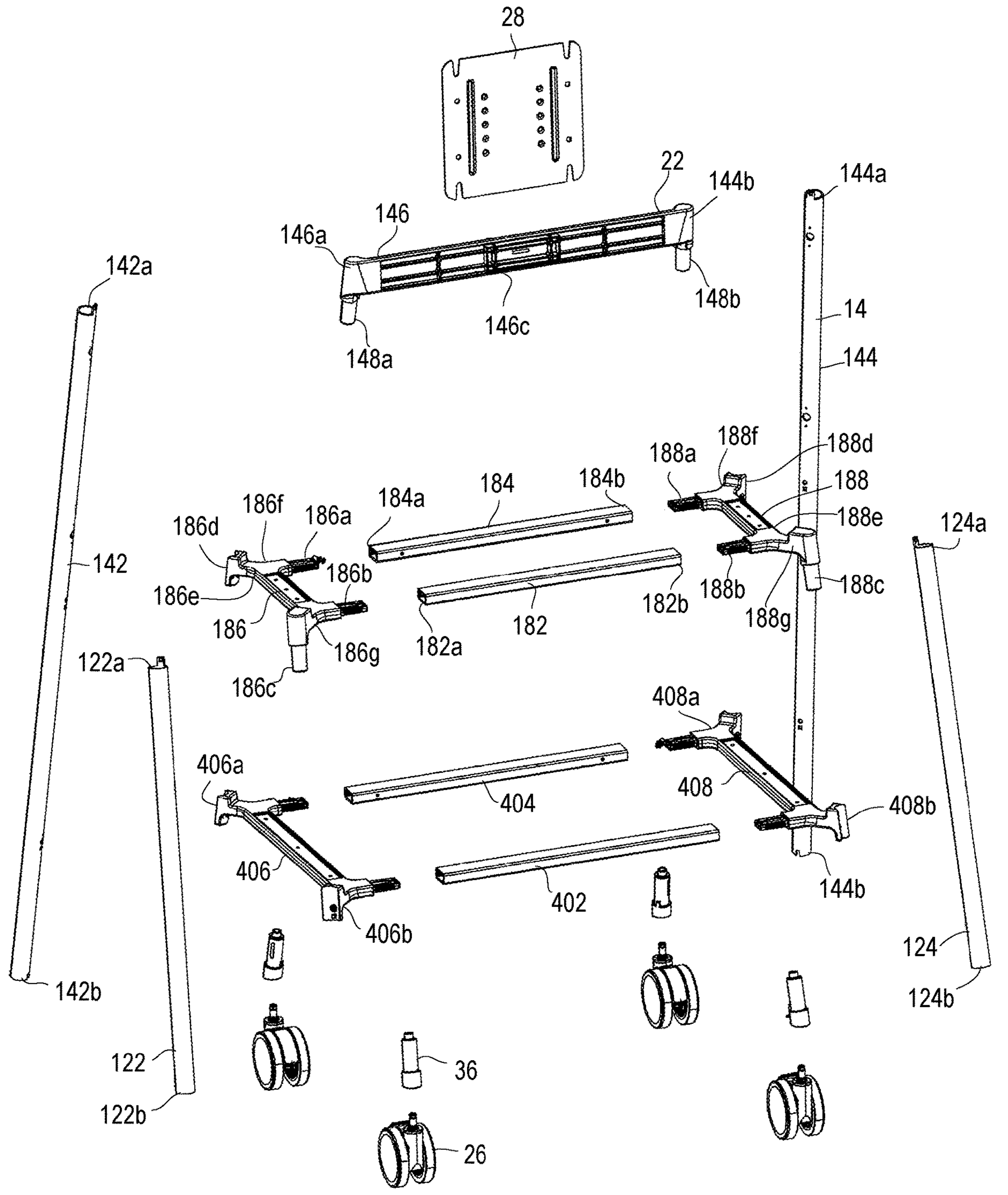
FIG. 5 is an exploded view of the cart assembly of FIG. 4.

As best shown in FIGS. 1, 3, and 4, a mounting member 28 (e.g., a first mounting member 28) may be coupled to the upper free end 22 of the rear frame 14 and configured to releasably support a display 30 (e.g., a first display 30). It will be understood the two embodiments of the mounting member 28 shown in FIGS. 3 and 4 are two non-limiting examples. As shown in FIGS. 3 and 4, the mounting member 28 includes a center plate 280 and two optional wings 282 and 284. In some embodiments, the center plate 280 without wings (e.g., as shown in FIGS. 4 and 5) is configured to support a VESA standard size monitor/display. In order to accommodate a larger monitor/display, a pair of wings may be attached to (e.g., bolted onto) the center plate 280 so as to effectively create a larger VESA mounting area (e.g., as shown in FIGS. 1 and 3). The optional wings 282 and 284 may be bolted on by the end user.

A Video Electronics Standards Association (VESA) pattern refers to the configuration of the four mounting holes on the back of a flat panel TV or computer monitor. In some embodiments, as shown in FIG. 3, the center plate 280 provides four VESA mounting holes 281 (e.g., screw holes) that are arranged in a square or rectangular configuration, such that a display with the same VESA pattern may be mounted on the center plate 280 via the VESA mounting holes 281. In some embodiments, as shown in FIG. 3, the two wings 282 and 284 provide another two sets of VESA mounting holes 283 and 285 (e.g., four mounting holes 283/285 arranged in a square or rectangular configuration) configured to accommodate displays with corresponding VESA patterns. The mounting member 28 (including the center plate 280 and the optional wings 282 and 284) may be shaped and sized and the VESA mounting holes provided on the mounting member 28 may be configured and arranged, as desired and/or needed, without departing from the scope of the present invention, as long as it is configured to releasably support a display thereon. The mounting member 28 may be configured to accommodate various types of displays.

The mounting member 28 may include a plurality of holes 286 configured for releasably coupling the mounting member 28 to the upper free end 22 of the rear frame 14. In some embodiments, as shown in FIG. 3, the mounting member 28 includes a plurality of holes 286 disposed at varying locations, such that the mounting member 28 may be positioned at varying heights after coupling to the upper free end 22 of the rear frame 14 via selected holes 286. In some embodiments, the upper free end 22 of the rear frame 14 may include a slot 220 configured such that the mounting member 28 may be slidably mounted on the upper free end 22 via selected holes 286 and the slot 220, such that the position of the mounting member 28 (e.g., and the display mounted thereon) may be adjusted along the slot 220, as desired and/or needed.

In some embodiments, the cart assembly 10 includes a base 24, where the front frame 12 and the rear frame 14 extends upwardly from the base 24. In some embodiments, the base 24 may include spaced apart floor engaging members 26 (e.g., wheels 26, shown in FIGS. 1-3), where the upper free end 22 of the rear frame 14 is disposed above the base 24 between the spaced apart floor engaging members 26. This arrangement is advantageous for allowing the center of gravity ("CoG") of a display 30 mounted on the upper free end 22 of the rear frame 14 to be positioned between the front frame 12 and the rear frame 14. With this configuration, the cart assembly 10 is made stable, but with a relative simply frame structure that may also provide storage options, as discussed in greater detail below.

The cart assembly 10, and various frame members in particular, may be constructed from various tubular parts and die cast parts having insert portions that are received in the tubular parts. For example, in some embodiments, as shown in FIGS. 3-7, the front frame 12 includes a pair of front frame members 122 and 124, where the front frame members 122 and 124 are configured with a tubular shape and extend between respective upper ends **122*a*, 124*a* and lower ends 122*b*, 124*b*. The rear frame 14 includes a pair of rear frame members 142 and 144, where the rear frame members 142 and 144 each configured with a tubular shape and extend between respective upper ends 142*a*, 144*a* and lower ends 142*b*, 144*b*. In some embodiments, as shown in FIGS. 3-7, the front frame members 122 and 124 have the same configuration (e.g., shape, size, length), the rear frame members 142 and 144 have the same configuration (e.g., shape, size, length), but with the front frame members being shorter than the rear frame members, creating an asymmetrical view along a vertical axis (e.g. mount axis A) down the middle of the cart assembly 10 from the side perspective. It will be appreciated that in other embodiments, the configuration of the front frame members 122 and 124 may be different and the configuration of the rear frame members 142 and 144** may be different, without departing from the scope of the present invention.

The rear frame 14 also includes a mounting bar 146 connected between the pair of rear frame members 142 and 144, and defining the upper end 22 in one embodiment. The mounting bar 146 is configured for supporting a mounting member 28 coupled thereto. As shown in FIG. 5, the mounting bar 146 is connected between upper ends 142*a* and 144*a* of the pair of rear frame members 142 and 144. The mounting bar 146 includes a main portion 146*c* extending between a first end 146*a* and a second end 146*b*, where the first end 146*a* and the second end 146*b* each include an insert portion 148*a* and 148*b* extending downwardly from the main portion 146*c* and configured to be received in the upper ends 142*a* and 144*a* of the pair of rear frame members 142 and 144, respectively.

Figure 6:
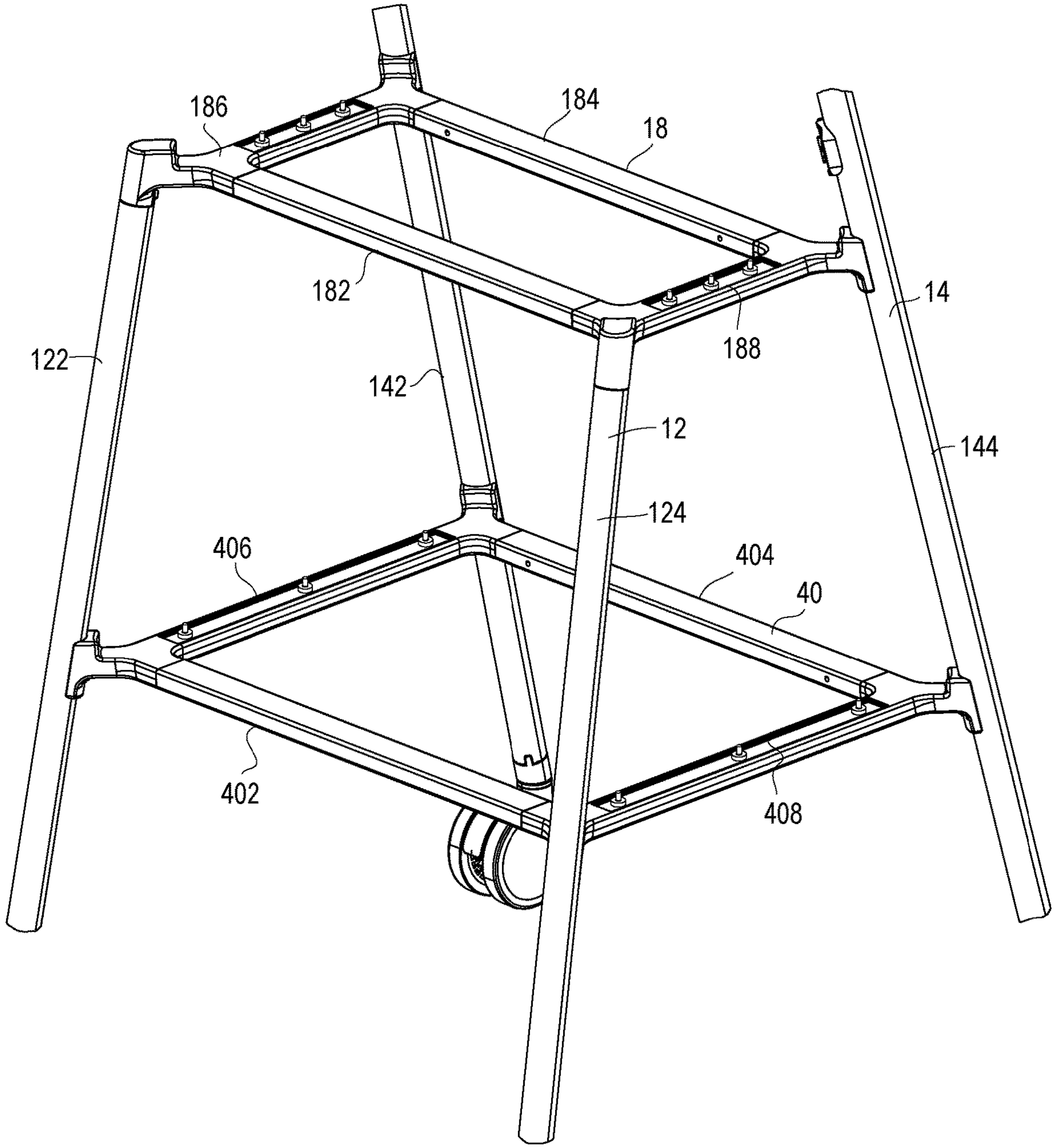
FIG. 6 is a partially enlarged perspective view of a portion of the cart assembly of FIG. 3.
Figure 7:
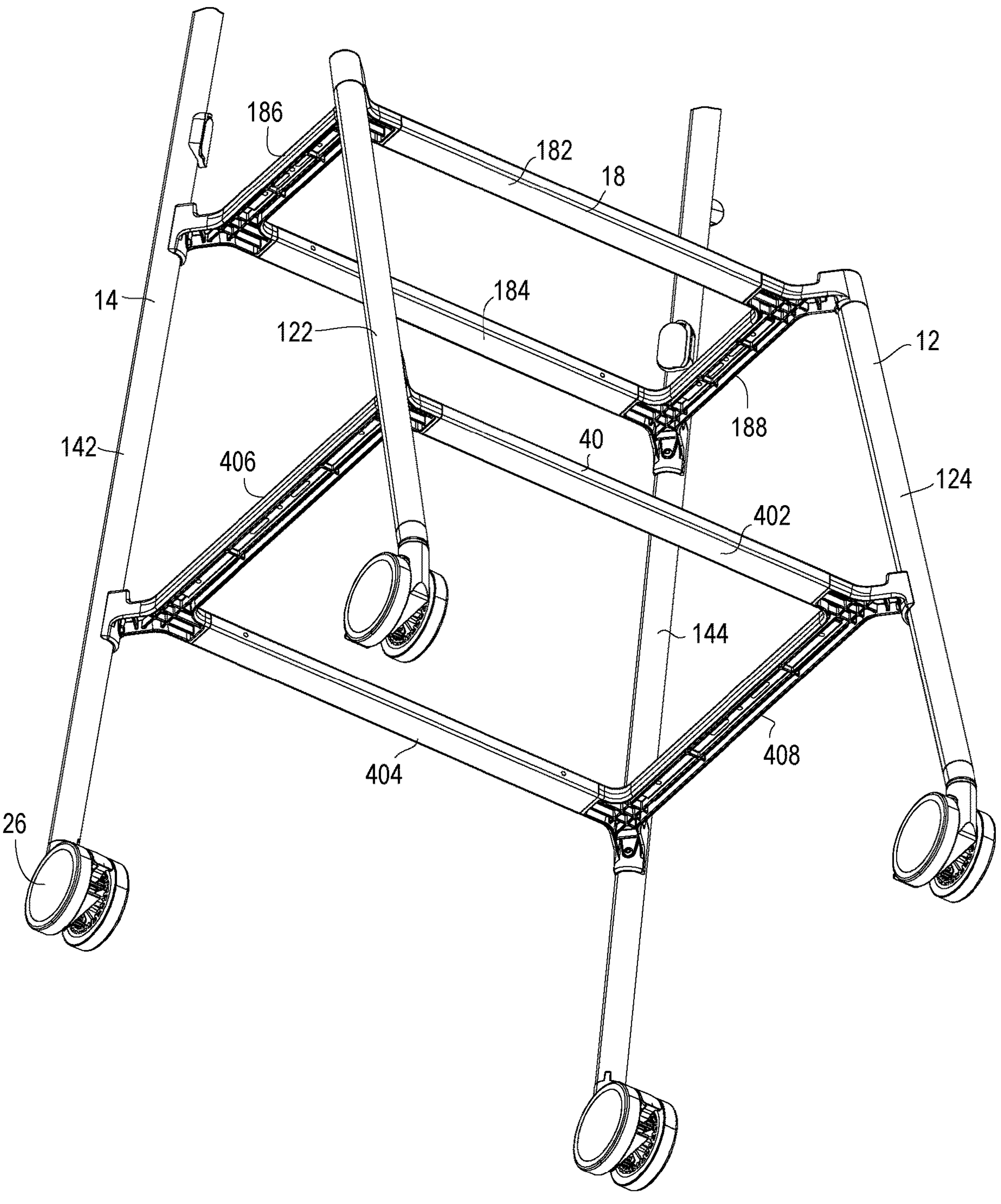
FIG. 7 is another partially enlarged perspective view of a portion of the cart assembly of FIG. 3.

Referring to FIGS. 5-7, the upper frame 18 includes a pair of upper frame members 182 and 184 and a pair of upper corner members 186 and 188. The upper frame members 182 and 184 are in tubular shapes, each extending between first ends 182*a*, 184*a* and second ends 184*a*, 184*b*, respectively. The upper corner members 186, 188 each include a main portion 186*e*, 188*e*, extending between a first end 186*f*, 188*f* and a second end 186*g*, 188*g*. The upper corner members 186, 188 each include a first insert portion 186*a*, 188*a* extending outwardly from the first ends 186*f*, 188*f* of the upper corner members 186, 188. The first insert portions 186*a* and 188*a* are configured to be at least partially received in the first and second ends 184*a* and 184*b* of the upper frame member 184. The upper corner members 186, 188 each also include a second insert portion 186*b*, 188*b* extending outwardly from the second ends 186*g*, 188*g* of the upper corner members 186, 188. The second insert portions 186*b* and 188*b* are configured to be at least partially received in the first and second ends 182*a* and 182*b* of the upper frame member 182.

The upper corner members 186 and 188 are configured to connect the pair of upper frame members 182 and 184 to the front frame 12 and the rear frame 14. As shown in FIGS. 5-7, the upper corner members 186, 188 each include a third insert portion 186*c*, 188*c* extending outwardly from the plane formed by the main portion 186*e* and the first and second insert portions 186*a* and 186*b* of the upper corner member 186 and from the plane formed by the main portion 188*e* and the first and second insert portions 188*a* and 188*b* of the upper corner member 188, respectively. The third insert portions 186*c* and 188*c* are configured to be received in the upper ends 122*a* and 124*a* of the front frame members 122 and 124, respectively. The upper corner members 186, 188 each include a connecting member 186*d*, 188*d* extending outwardly from the first ends 186*f*, 188*f*, respectively. The connecting members 186*d*, 188*d* are configured to be secured to the rear frame members 142, 144, respectively. As shown in FIG. 7, the connecting members 186*d*, 188*d* are screwed to the rear frame members 142, 144, respectively. It will be appreciated that the connecting members 186*d*, 188*d* may be configured to be secured to the rear frame members 142, 144 through any suitable means, including but not limited to, nuts/bolts.

As shown in FIGS. 6 and 7, the upper frame members 182, 184 and the upper corner members 186, 188 are shaped and sized such that when the upper frame members 182, 184 and the upper corner members 186, 188 are connected via the first and second insert portions 186*a*, 186*b*, 188*a*, and 188*b*, the front frame members 122, 124 can be connected to the upper corner members via the third insert portions 186*c*, 188*c*, and the rear frame members 142 and 144 can be connected to the upper corner members via the connecting members 186*d*, 188*d*, forming a stable cart assembly.

The rear frame members 142, 144, the front frame members 122, 124, the upper frame members 182, 184, and the main portions 186*e*, 188*e* of the upper corner members 186 are configured (e.g., length, shape, size), and the orientation of the extension of the first, second, and third insert portions 186*a*, 186*b*, 186*c*, 188*a*, 188*b*, and 188*c*, and the orientation of the extension of the connecting members 186*d*, 188*d* are configured (e.g., relative angels therebetween), such that when the upper frame 18 is connected between the upper end 20 of the front frame 12 and a portion of the rear frame 14 spaced below the upper free end 22 of the rear frame 14, the upper free end 22 of the rear frame 14 is cantilevered over the upper frame 18.

It will be appreciated that these features can be varied, as desired and/or needed, without departing from the present invention, as long as when the upper frame 18 is connected between the front frame 12 and a portion of the rear frame 14 spaced below the upper free end 22 of the rear frame 14, the upper free end 22 of the rear frame 14 is cantilevered over the upper frame 18. For example, in some embodiments, the upper frame 18 may be configured (e.g., by replacing the third insert portions 186*c*, 188*c* with components similar to connecting members 186*d*, 188*d*) to be connected between a portion of the front frame 12 spaced below the upper end 20 of the front frame 12 and a portion of the rear frame 14 spaced below the upper free end 22 of the rear frame 14.

In some embodiments, more than one frame, which may have a horizontal orientation, may be connected between the front frame 12 and the rear frame 14, for various purposes, such as providing varying storage options. For example, as shown in FIGS. 1-7, the cart assembly 10 also includes a lower frame 40 connected between the front frame 12 and the rear frame 14 and disposed below the upper frame 18. The lower frame 40 has a horizontal orientation in one embodiment. As shown in FIG. 5, the lower frame 40 includes a pair of lower frame members 402 and 404 and a pair of lower corner members 406 and 408, where the lower corner members 406 and 408 connect the pair of lower frame members 402 and 404 to the front frame 12 and the rear frame 14. The lower frame members 402 and 404 have tubular configurations similar to the upper frame members 182 and 184. The lower corner members 406 and 408 have configurations similar to the upper corner members 186 and 188, where the lower corner members 406 and 408 each include a first connecting member 406*a*, 408*a*, configured to be secured to the rear frame members 142 and 144, respectively, and a second connecting member 406*b*, 408*b*, configured to be secured to the front frame members 122 and 124, respectively. For the sake of brevity, the configuration of the lower corner members 406 and 408, the connection between the lower corner members 406, 408 and the lower frame members 402, 404, and the connection between the lower corner members 406, 408 and the front and rear frames 12 and 14 will not be described in detail, as a person of ordinary skill in the art will understand these by referring to the description above with respect to the upper frame 18.

In some embodiments, as shown in FIG. 1, the cart assembly 10 also includes an upper support member or shelf 32 disposed on the upper frame 18 and a lower support member or shelf 34 disposed on the lower frame 40. The upper support member 32 and the lower support member 34 may be made of wood or other similar natural materials. The upper support member 32 and the lower support member 34 may be coupled to the upper frame 18 and the lower frame 40, respectively, via any suitable means. For example, the upper support member 32 may be coupled to the upper corner members 186 and 188 or other portions of the upper frame 18. The upper support member 32 can be fixed for movement with the cart assembly 10. In some embodiments, the upper support member 32 and/or the lower support member 34 may be coupled directly to and between the front frame 12 and the rear frame 14. In some embodiments, the upper support member 32 and/or the lower support member 34 may extend horizontally or tilt with respect to a floor upon which the cart assembly 10 is disposed. In some embodiments, the upper support member 32 and/or the lower support member 34 may provide a continuous and smooth surface between the front frame 12 and the rear frame 14. In some embodiments, the upper support member 32 and/or the lower support member 34 may provide a surface with opening(s) between the front frame 12 and the rear frame 14. It will be appreciated that the configuration of the upper support member 32 and/or the lower support member 34 may be varied, as desired and/or needed, without departing from the scope of the present invention, as long as they provide a surface between/connecting the front frame 12 and the rear frame 14.

Each floor engaging member 26 may be coupled (e.g., rotatably coupled) to a respective lower end of the front frame members **122*b*, 124*b* and/or a lower end of the rear frame members 142*b*, 144*b* via any suitable means. For example, as shown in FIG. 5, each floor engaging member 26 is coupled to a lower end of a front/rear frame member via an insert member 36** configured to be received in the lower end of a front/rear frame member.

Figure 8:
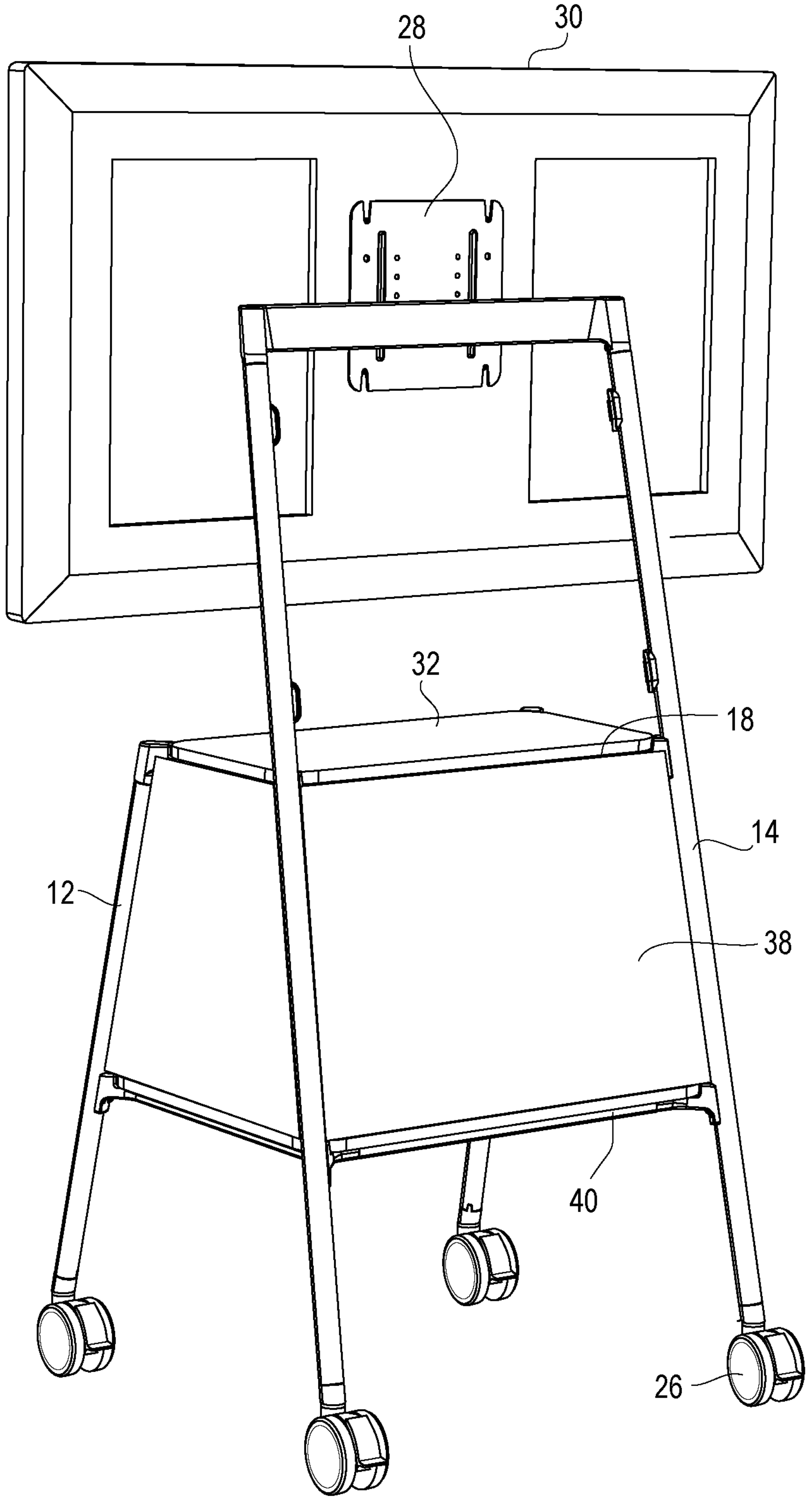
FIG. 8 is a perspective view of another embodiment of a cart assembly supporting a first display, a shelf unit, and an air purifier.
Figure 10:
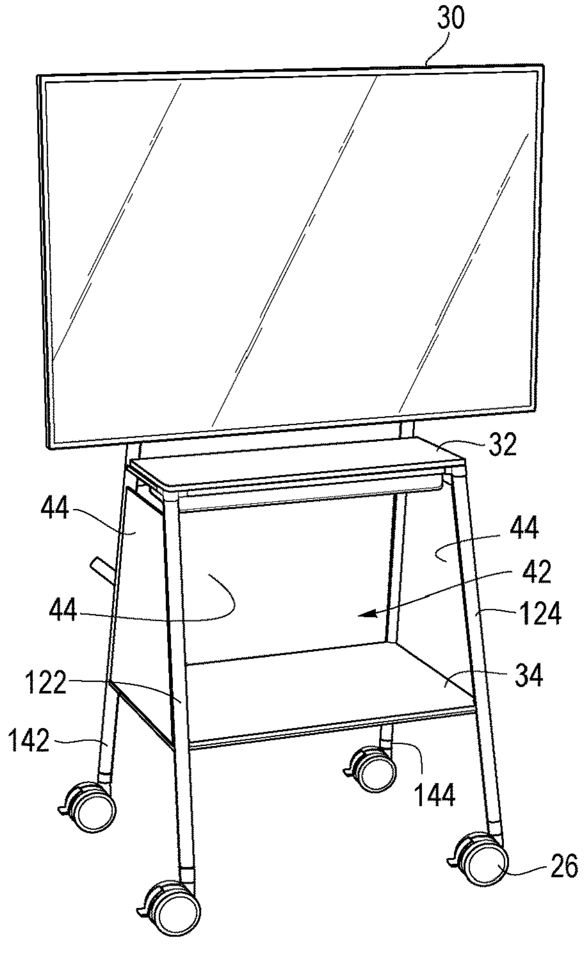
FIG. 10 is a perspective view of another embodiment of a cart assembly supporting a first display and defining a storage container including a cavity.

The cart assembly 10 may be configured with a plurality of accessory components to provide various storage options and other functionalities. As one example, as shown in FIG. 8, a first accessory component is configured as an air purifier 38, which may be disposed in a space defined between the upper frame 18 and the lower frame 40. As another example, as shown in FIG. 10, the upper support member 32 and the lower support member 34 may define a cavity 42, where a second accessory component is configured as a side member 44, and the cavity 42 may be enclosed by the upper support member 32, the lower support member 34, and side members 44 disposed between the front frame members 122, 124 and the rear frame members 142, 144. FIG. 10 shows a non-limiting example of such a cavity, where the access to the cavity 42 is provided between the front frame members 122 and 124. It will be appreciated that the access to the cavity 42 may be provided at other locations, as desired and/or needed, depending on the positioning of the side members 44, without departing from the scope of the present invention.

Figure 9:
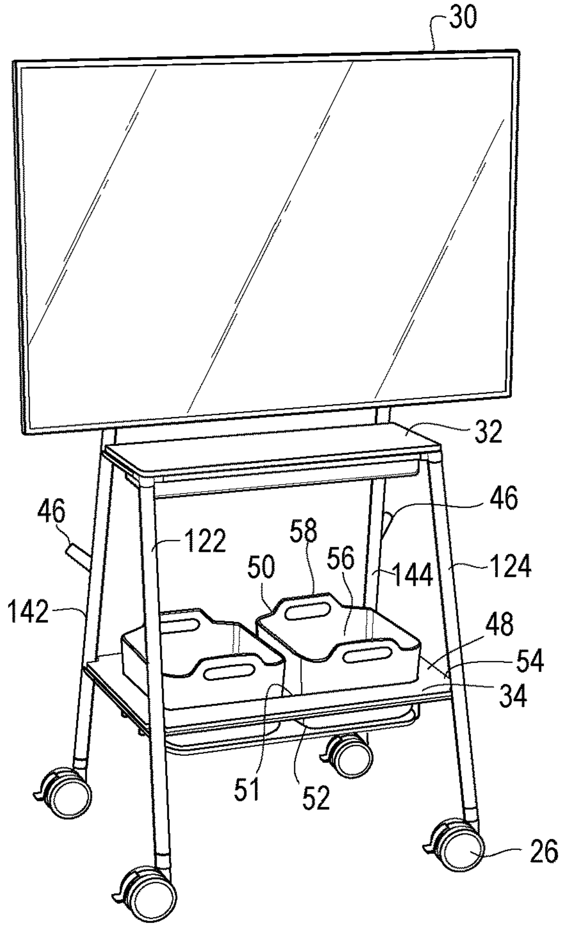
FIG. 9 is a perspective view of another embodiment of a cart assembly supporting a first display, two shelf units, and two containers for storage.

As another example, as shown in FIG. 9, a third accessory component is configured as a post 46 that may be fixedly connected to, and extends outwardly and upwardly from a front frame member 122, 124 (now shown in FIG. 9), and/or a rear frame member 142, 144. The post 46 may function as a hanger for supporting items thereon. It will be appreciated that the number, the position, and the configuration (e.g., shape, size) of the post 46 may be varied, as desired and/or needed, without departing from the scope of the present invention.

As another example, as shown in FIG. 9, a fourth accessory component is configured as a storage device 48, including the lower support member 34 and at least one container 50 disposed on the lower support member 34 and configured to receive and support an item therein. As shown in FIG. 9, the lower support member 34 includes an upper plate 54 with a cutout 51 and a lower plate 52 extending downwardly from the cutout 51. The lower plate 52 may be attached to the upper plate 54 via any suitable means, such as via wires shown in FIG. 9. At least one container 50 may be received in the cutout 51 and disposed on the lower plate 52. It will be appreciated that the configuration (e.g., shape, size) of the cutout 51, the lower plate 52, and the container 50 may be varied, as desired and/or needed, without departing from the present invention. For example, as shown in FIG. 9, the container 50 may include an opening 56 and at least one handle portion 58 extending upwardly from the opening 56. The number of the containers 50 disposed on the lower support member 34 may be varied, as desired and/or needed, depending on the shape and size of the container 50 and the cutout 51, without departing from the scope of the present invention.

Figure 11:
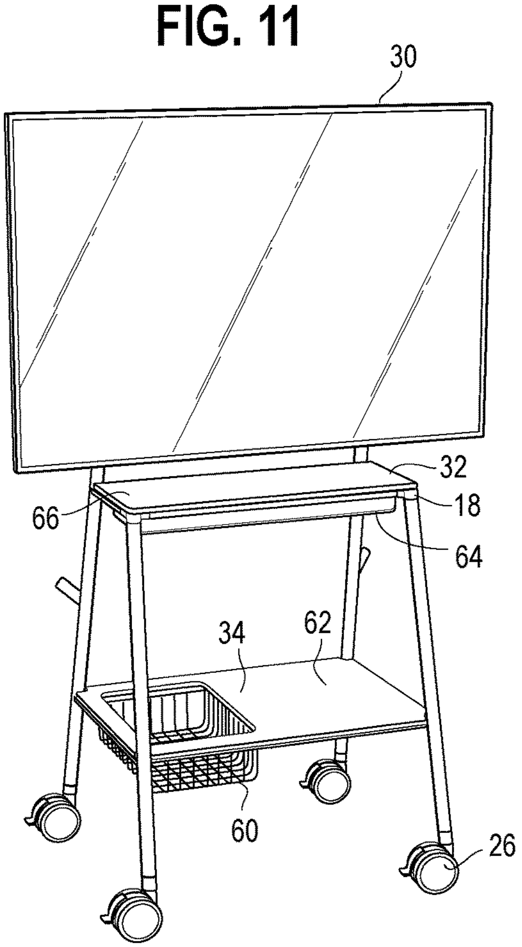
FIG. 11 is a perspective view of another embodiment of a cart assembly supporting a first display and including a lower support member configured with a basket for storage.
Figure 12:
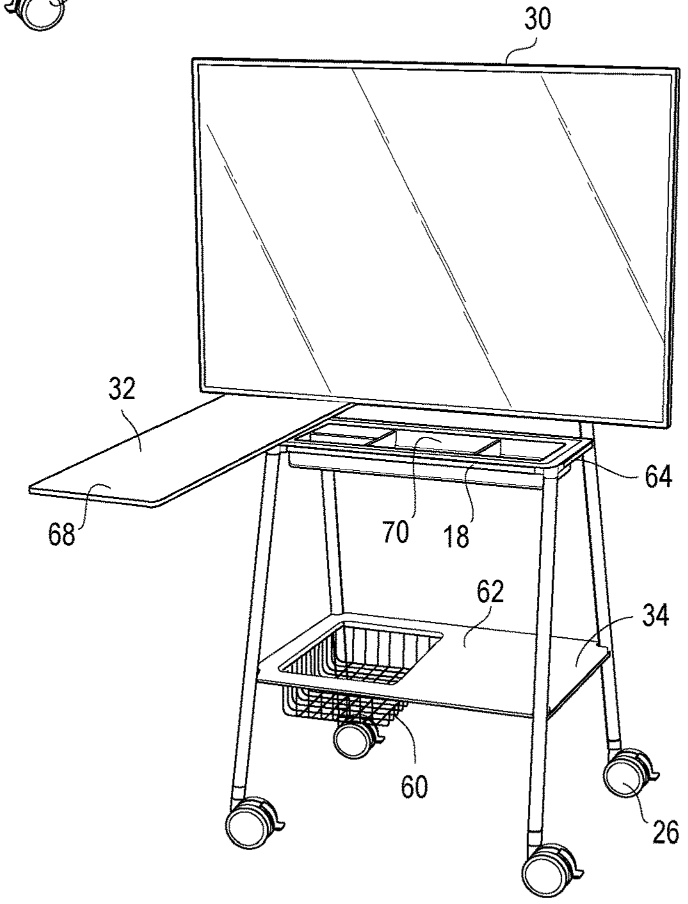
FIG. 12 is a perspective view of another embodiment of a cart assembly supporting a first display and including a pivotable upper container/drawer assembly and a lower support member configured with a basket for storage.
Figure 13:
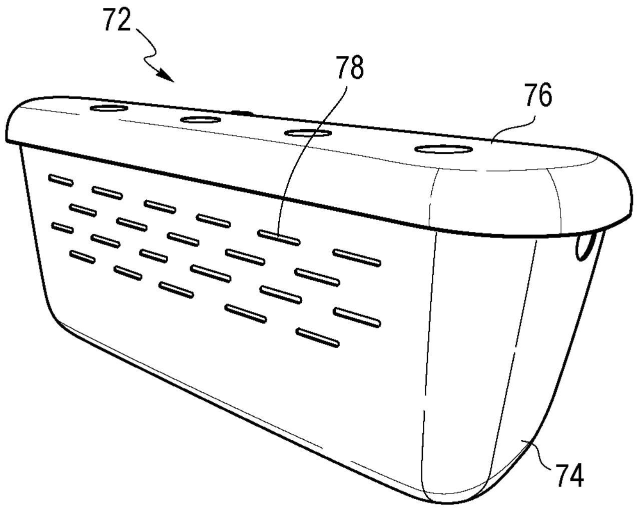
FIG. 13 is a perspective view of an embodiment of the basket of FIG. 1.
Figure 14:
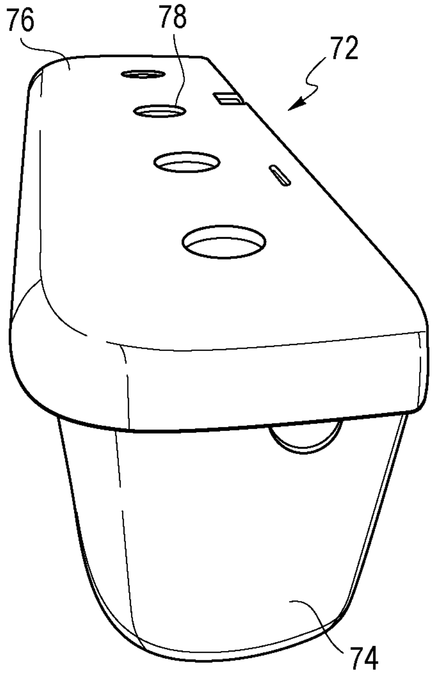
FIG. 14 is another perspective view of the basket of FIG. 13.

As another example, as shown in FIGS. 11 and 12, the lower support member 34 may be configured with a fifth accessory component which is configured to be a wire basket 60. The wire basket 60 may be releasably coupled to the lower support member 34 or may be integrally formed with the lower support member 34. As shown in FIGS. 11 and 12, the wire basket 60 may extend downwardly from the upper surface 62 of the lower support member 34. It will be appreciated that the number, the configuration (e.g., shape, size, depth), and the position of the wire basket 60 may be varied, as desired and/or needed, without departing from the scope of the present invention.

As another example, as shown in FIGS. 11 and 12, a sixth accessory component may be configured as a container/drawer 64 disposed on the upper frame 18 and disposed below the upper support member 32. As shown in FIG. 12, the upper support member 32 may be pivotally attached to the upper frame 18, where the upper support member 32 pivots between a first position 66 (FIG. 11), where the upper support member 32 is disposed on the upper frame 18, and a second position 68 (FIG. 12), where the upper support member 32 is pivoted away from the upper frame 18 to provide access to the container/drawer 64. The container/drawer 64 may be coupled to the upper frame 18 via any suitable means, and the container/drawer 64 may include a plurality of segments 70 to provide various storage options, as shown in FIG. 12. It will be appreciated that the configuration of the container/drawer 64 and the position of the pivotable engagement between the upper support member 32 and the upper frame 18 may be varied, as desired and/or needed, without departing from the scope of the present invention.

As another example, as shown in FIGS. 1, 2, 13, and 14, a seventh accessory component may be configured as a basket 72 including a basket body 74 and a basket lid 76. The basket 72 may be made of PET material. The basket lid 76 may be pivotally attached to the basket body 74. The basket 72 may be configured to be attached to the cart assembly 10, via any suitable means, behind the display 30 mounted on the mounting member 28 (e.g., shown in FIG. 1), such that the basket 72 may be used for storage of wires. The basket body 74 and the basket lid 76 may each include spaced apart holes/slots 78 for air flow. It will be appreciated the shape and size of the basket 72, and the shape, size, and position of the holes/slots 78 may be varied, as desired and/or needed, without departing from the scope of the present invention.

Figure 16:
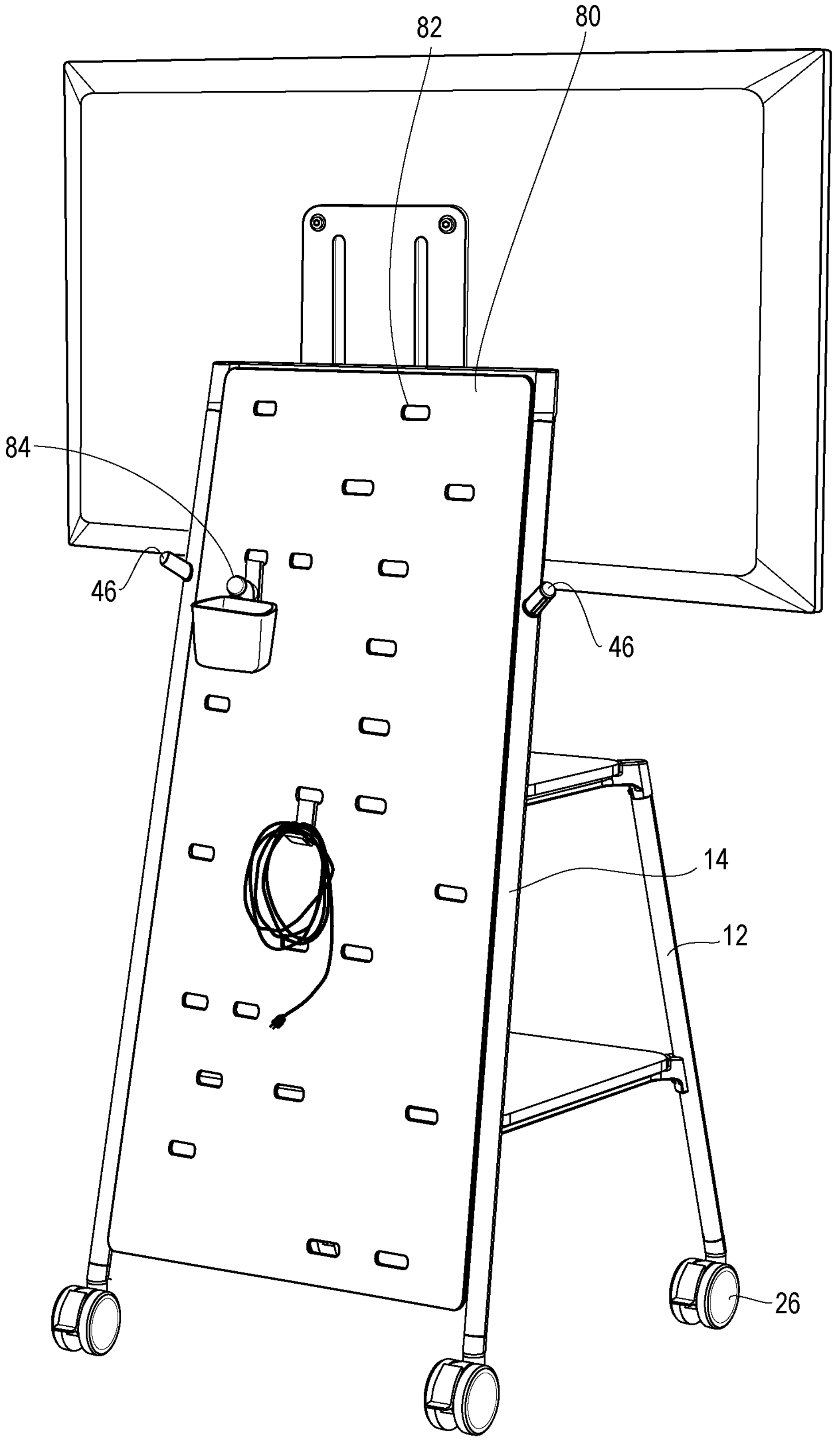
FIG. 16 is a perspective view of another embodiment of a cart assembly supporting a weighted board.

In some embodiments, as shown in FIG. 16, an eighth accessory component may be configured as a board 80 configured to be secured to the rear frame 14. In some embodiments, the board 80 may include spaced apart holes/slots 82 for air flow and/or for retaining hooks or fasteners on the board at various locations. In some embodiments, the board 80 may include a storage accessory. For example, as shown in FIG. 16, at least one post or hook 84 may extend outwardly and upwardly from a slot 82 in the board 80, which may function as a hanger for supporting items (e.g., basket, bin, wire) thereon. It will be appreciated that the configuration (e.g., shape, size) of the board 80, the number, configuration (e.g., shape, size), and position of the post 84, and the number, configuration (e.g., shape, size), and position of the holes/slots 82 may be varied, as desired and/or needed, without departing from the scope of the present invention.

Figure 15:
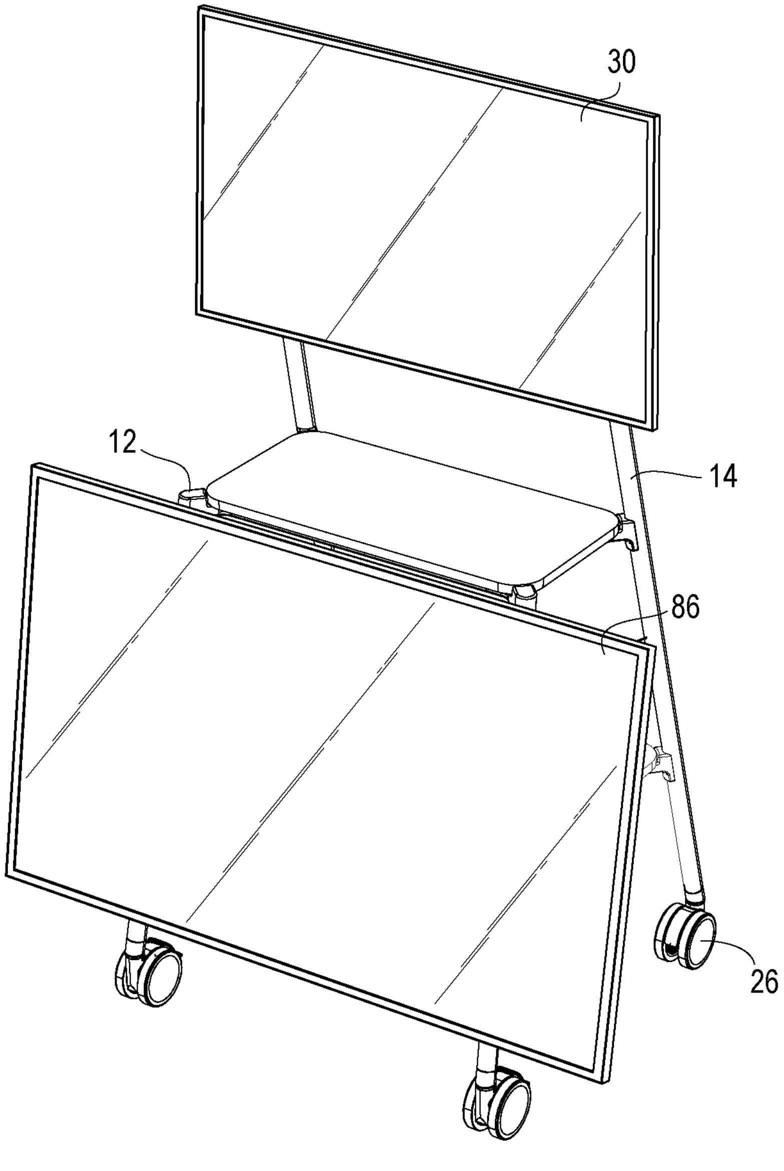
FIG. 15 is a perspective view of another embodiment of a cart assembly supporting a first display and a second display.
Figure 17:
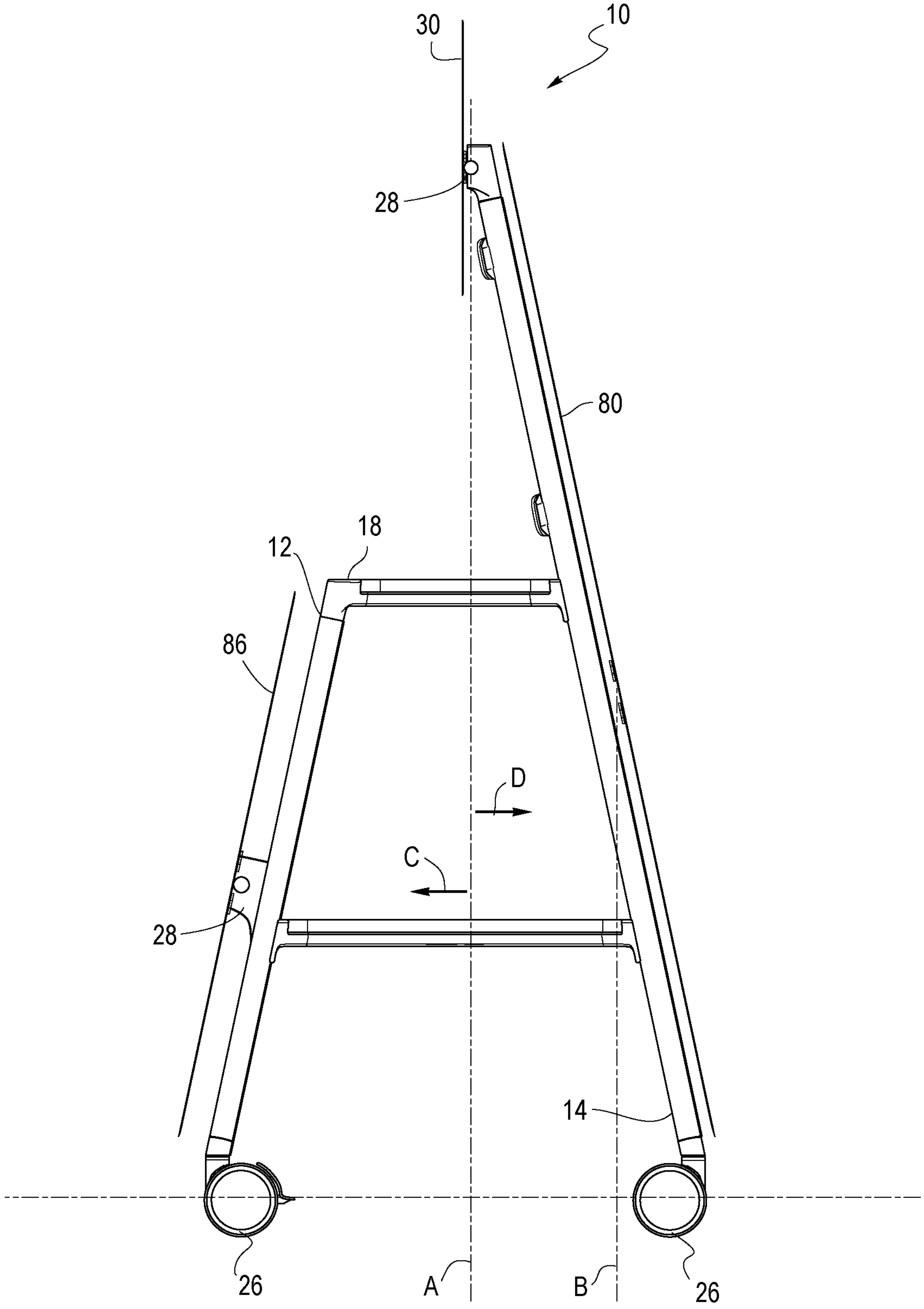
FIG. 17 is a schematic side view of another embodiment of a cart assembly supporting a first display, a second display, and a weighted board.

In some embodiments, the cart assembly 10 may be configured to support more than one (e.g., two) displays. As shown in FIGS. 15 and 17, a second mounting member 28 may be coupled to the front frame 12, where the second mounting member is configured to support a second display 86. The second display 86 may be configured to display the same information/data as, or different information/data from, the first display 30. For example, in a video conferencing setting, the first display 30 may be configured to display a video of one or more remote participants in the meeting, so that the remote participants are closer to eye level with any in person participants in the meeting, while the second display 86 may be configured to display content that all participants are reviewing or using in the meeting (e.g. a PowerPoint presentation, database, website, etc).

In some embodiments, the board 80 as illustrated in FIGS. 16 and 17 may be weighted and configured to provide counterbalance to the cart assembly 10 when two or more displays are mounted on the cart assembly 10. As shown in FIGS. 16 and 17, the board 80 is positioned on the opposite side of the cart assembly 10 from the displays 30 and 86 and provides a unique way of maintaining the cart assembly 10 balance with two displays without use of a broader base footprint (e.g. kickstand). As shown in FIGS. 15 and 17, when the second display 86 is mounted on the front frame 12, the second display 86 will typically stick forwardly outward from the front frame 12 at least a few inches (depth of the second display 86), which causes the CoG of the cart assembly to shift from the single display version (e.g., shifting from the mount axis A towards a front floor engaging member (e.g., a floor engaging member coupled to the lower end of the front frame 12) in the direction of C shown in FIG. 17). In some embodiments, without the board 80, the CoG of the cart assembly 10 with the first and second displays 30 and 86 may be shifted to a position between the front floor engaging member and the rear floor engaging member (e.g., a floor engaging member coupled to the lower end of the rear frame 14) and closer to the front floor engaging member or even may be shifted to a position forwardly outside of the front floor engaging member.

In some embodiments, the board 80 extends from a lower position up towards a higher position (e.g., the top) of the rear frame 14, and may be directly mounted thereto, such that only a thickness of the board 80 extends rearwardly from the rear frame and such that the CoG of the board 80 may be disposed between the front floor engaging member and the rear floor engaging member and closer to the rear floor engaging member (e.g., disposed along an axis B shown in FIG. 17 that is parallel to and laterally and backwardly spaced apart from the mount axis A). The board 80 mounted on the rear frame 14 causes the CoG of the cart assembly 10 (e.g., without any displays, with both displays or with the first display 30 only) to shift in the direction D (e.g., as shown in FIG. 17) towards the rear floor engaging member (e.g., from the mount axis A). With the board 80 mounted on the rear frame 14, the CoG of the cart assembly 10 (e.g., without any displays, with both displays or with the first display 30 only) may be positioned between the front and rear floor engaging members and closer to the rear floor engaging member in one embodiment, such that the cart assembly 10 (e.g., without any displays, with both displays or with the first display 30 only) will be stable.

In some embodiments, when the first and second displays 30 and 86 are both mounted on the cart assembly 10, the board 80 mounted on the rear frame 14 is configured to balance out the shift of CoG caused by the second display 86, such that the overall cart assembly 10 with two displays 30 and 86 may have a CoG between the front and rear floor engaging members and closer to the rear floor engaging member than to the front floor engaging member, or a CoG approximately equidistant from the front and rear floor engaging members, such that the cart assembly 10 with the first and second displays 30 and 86 mounted thereon is stable. It will be appreciated that the various embodiments of the cart assembly 10 and the accessory components may be combined, as desired and/or needed, without departing from the scope of the present invention.

Various embodiments of a cart assembly may be provided as described above.

A1 In an example, a cart assembly comprises a front frame; a rear frame extending toward the front frame at an acute angle relative to a vertical plane; and an upper frame connected between an upper end of the front frame and a portion of the rear frame, where an upper free end of the rear frame is cantilevered over the upper frame and supports a mounting member configured to support a display.

A2 The cart assembly of example A1, further comprising posts extending outwardly from the front frame and/or the rear frame.

A3 The cart assembly of example A1 or A2, further comprises at least one floor engaging member coupled to lower ends of the front frame and the rear frame.

A4 The cart assembly of any of examples A1-A3, where the front frame comprises a pair of front frame members, where the rear frame comprises a pair of rear frame members and a mounting bar connected between upper ends of the pair of rear frame members, where the upper frame comprises a pair of upper frame members and a pair of upper corner members, and where the upper corner members connect the pair of upper frame members to the front frame and the rear frame.

A5 The cart assembly of any of examples A1-A4, where the mounting member comprises a first mounting member and the display comprises a first display, and where the front frame supports a second mounting member configured to support a second display.

A6 The cart assembly of any of examples A1-A5, further comprises a board secured to the rear frame.

A7 The cart assembly of any of examples A1-A6, where the board is configured to support a storage accessory.

A8 The cart assembly of any of examples A1-A7, further comprises a lower frame connected between the front frame and the rear frame and disposed below the upper frame.

A9 The cart assembly of any of examples A1-A8, where the lower frame comprises a pair of lower frame members and a pair of lower corner members, and where the lower corner members connect the pair of lower frame members to the front frame and the rear frame.

A10 The cart assembly of any of examples A1-A9, where an air purifier is disposed in a space defined between the upper frame and the lower frame.

A11 The cart assembly of any of examples A1-A10, further comprises an upper support member disposed on the upper frame and a lower support member disposed on the lower frame.

A12 The cart assembly of any of examples A1-A11, where the upper support member and the lower support member define a cavity therebetween.

A13 The cart assembly of any of examples A1-A12, further comprises a container disposed on the lower support member and configured to receive and support an item therein.

A14 The cart assembly of any of examples A1-A13, further comprises a basket including a basket body and a basket lid, where the basket body comprises spaced apart holes for air flow, and where the basket lid is pivotally attached to the basket body.

A15 The cart assembly of any of examples A1-A14, where the basket is made of PET material.

A16 The cart assembly of any of examples A1-A15, further comprises a container disposed on the upper frame and disposed below the upper support member, where the upper support member is pivotally attached to the upper frame, where the upper support member pivots between a first position, where the upper support member is disposed on the upper frame, and a second position, where the upper support member is pivoted away from the upper frame to provide access to the container.

A17 The cart assembly of any of examples A1-A16, where the front frame and the rear frame are made of steel/metal and the upper support member is made of wood or similar natural material.

A18 The cart assembly of any of examples A1-A17, where the acute angle is between 5 and 45 degrees.

A19 The cart assembly of any of examples A1-A18, where the mounting member comprises a center plate and two optional wings attachable to the center plate.

B1 In an example, a cart assembly, comprises: a base comprising spaced apart floor engaging members; a frame extending upwardly from the base at an acute angle relative to a vertical plane, where the frame comprises a free end disposed above the base between the spaced apart floor engaging members; and a mounting member coupled to the free end of the frame and configured to support a display.

B2 The cart assembly of example B1, further comprises a front frame extending upwardly from the base and an upper frame connected between an upper end of the front frame and a portion of the frame spaced below the free end of the frame.

B3 The cart assembly of example B1 or B2, where the front frame comprises a pair of front frame members, where the frame comprises a pair of rear frame members and a mounting bar connected between upper ends of the pair of rear frame members, where the upper frame comprises a pair of upper frame members and a pair of upper corner members, and where the upper corner members connect the pair of upper frame members to the front frame and the frame.

B4 The cart assembly of examples B1-B3, where the mounting member comprises a first mounting member and the display comprises a first display, and where the front frame supports a second mounting member configured to support a second display.

B5 The cart assembly of examples B1-B4, further comprises a board secured to the frame.

B6 The cart assembly of examples B1-B5, where the board comprises a storage accessory.

B7 The cart assembly of examples B1-B6, further comprises a lower frame connected between the front frame and the frame and disposed below the upper frame.

B8 The cart assembly of examples B1-B7, where the lower frame comprises a pair of lower frame members and a pair of lower corner members, and where the lower corner members connect the pair of lower frame members to the front frame and the frame.

B9 The cart assembly of examples B1-B8, where an air purifier is disposed in a space between the upper frame and the lower frame.

B10 The cart assembly of examples B1-B9, further comprises an upper support member disposed on the upper frame and a lower support member disposed on the lower frame.

B11 The cart assembly of examples B1-B10, where the upper support member and the lower support member define a cavity therebetween.

B12 The cart assembly of examples B1-B11, further comprises a container disposed on the lower support member and configured to receive and support an item therein.

B13 The cart assembly of examples B1-B12, further comprises a basket including a basket body and a basket lid, where the basket body comprises spaced apart holes for air flow, and where the basket lid is pivotally attached to the basket body.

B14 The cart assembly of examples B1-B13, further comprises a container disposed on the upper frame and disposed below the upper support member, where the upper support member is pivotally attached to the upper frame, where the upper support member pivots between a first position, where the upper support member is disposed on the upper frame, and a second position, where the upper support member is pivoted away from the upper frame to provide access to the container.

B15 The cart assembly of examples B1-B14, where the acute angle is between 5 and 45 degrees.

C1 In an example, a cart assembly, comprises: a front frame; a rear frame extending toward the front frame at an acute angle relative to a vertical plane, and where the rear frame comprises an upper free end; an upper frame connected between an upper end of the front frame and a portion of the rear frame spaced below the upper free end, where the upper free end of the rear frame is cantilevered over the upper frame; a first mounting member coupled to the upper free end of the rear frame, where the first mounting member is configured to support a first display; and a second mounting member coupled to the front frame, where the second mounting member is configured to support a second display.

C2 The cart assembly of example C1, further comprises posts extending outwardly from the front frame and/or the rear frame.

C3 The cart assembly of example C1 or C2, further comprises at least one floor engaging member coupled to lower ends of the front frame and the rear frame.

C4 The cart assembly of examples C1-C3, where the front frame comprises a pair of front frame members, where the rear frame comprises a pair of rear frame members and a mounting bar connected between upper ends of the pair of rear frame members, where the upper frame comprises a pair of upper frame members and a pair of upper corner members, and where the upper corner members connect the pair of upper frame members to the front frame and the rear frame.

C5 The cart assembly of examples C1-C4, further comprises a board secured to the rear frame, where the board is configured to support a storage accessory.

C6 The cart assembly of examples C1-C5, where the board acts as a counterweight to a second display on the front frame.

C7 The cart assembly of examples C1-C6, further comprises a lower frame connected between the front frame and the rear frame and disposed below the upper frame.

C8 The cart assembly of examples C1-C7, where the lower frame comprises a pair of lower frame members and a pair of lower corner members, and where the lower corner members connect the pair of lower frame members to the front frame and the rear frame.

C9 The cart assembly of examples C1-C8, further comprises an upper support member disposed on the upper frame and a lower support member disposed on the lower frame.

C10 The cart assembly of examples C1-C9, where the upper support member and the lower support member define a cavity therebetween.

C11 The cart assembly of examples C1-C10, further comprises a container disposed on the lower support member and configured to receive and support an item therein.

C12 The cart assembly of examples C1-C11, further comprises a basket including a basket body and a basket lid, where the basket body comprises spaced apart holes for air flow, and where the basket lid is pivotally attached to the basket body.

C13 The cart assembly of examples C1-C12, further comprises a container disposed on the upper frame and disposed below the upper support member, where the upper support member is pivotally attached to the upper frame, where the upper support member pivots between a first position, where the upper support member is disposed on the upper frame, and a second position, where the upper support member is pivoted away from the upper frame to provide access to the container.

C14 The cart assembly of examples C1-C13, where the acute angle is between 5 and 45 degrees.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

We claim:

1. A cart assembly, comprising:

a front frame;

a rear frame extending toward the front frame at an acute angle relative to a vertical plane; and an upper frame connected between an upper end of the front frame and a portion of the rear frame, wherein an upper free end of the rear frame is cantilevered over the upper frame and supports a mounting member configured to support a display.

2. The cart assembly of claim 1, further comprising posts extending outwardly from the front frame and/or the rear frame.

3. The cart assembly of claim 1, further comprising at least one floor engaging member coupled to lower ends of the front frame and the rear frame.

4. The cart assembly of claim 1, wherein the front frame comprises a pair of front frame members, wherein the rear frame comprises a pair of rear frame members and a mounting bar connected between upper ends of the pair of rear frame members, wherein the upper frame comprises a pair of upper frame members and a pair of upper corner members, and wherein the upper corner members connect the pair of upper frame members to the front frame and the rear frame.

5. The cart assembly of claim 1, wherein the mounting member comprises a first mounting member and the display comprises a first display, and wherein the front frame supports a second mounting member configured to support a second display.

6. The cart assembly of claim 1, further comprising a board secured to the rear frame.

7. The cart assembly of claim 6, wherein the board is configured to support a storage accessory.

8. The cart assembly of claim 1, further comprising a lower frame connected between the front frame and the rear frame and disposed below the upper frame.

9. The cart assembly of claim 8, wherein the lower frame comprises a pair of lower frame members and a pair of lower corner members, and wherein the lower corner members connect the pair of lower frame members to the front frame and the rear frame.

10. The cart assembly of claim 8, further comprising an upper support member disposed on the upper frame and a lower support member disposed on the lower frame.

11. The cart assembly of claim 10, wherein the upper support member and the lower support member define a cavity therebetween.

12. The cart assembly of claim 10, further comprising a container disposed on the lower support member and configured to receive and support an item therein.

13. The cart assembly of claim 1, wherein the acute angle is between 5 and 45 degrees.

14. The cart assembly of claim 1, wherein the mounting member comprises a center plate and two wings attachable to the center plate.

15. A cart assembly, comprising:

a front frame;

a rear frame extending toward the front frame at an acute angle relative to a vertical plane, and wherein the rear frame comprises an upper free end;

an upper frame connected between an upper end of the front frame and a portion of the rear frame spaced below the upper free end, wherein the upper free end of the rear frame is cantilevered over the upper frame;

a first mounting member coupled to the upper free end of the rear frame, wherein the first mounting member is configured to support a first display; and a second mounting member coupled to the front frame, wherein the second mounting member is configured to support a second display.

16. The cart assembly of claim 15, further comprising posts extending outwardly from the front frame and/or the rear frame.

17. The cart assembly of claim 15, further comprising at least one floor engaging member coupled to lower ends of the front frame and the rear frame.

18. The cart assembly of claim 15, further comprising a board secured to the rear frame, wherein the board is configured to support a storage accessory.

19. The cart assembly of claim 18, wherein the board acts as a counterweight to the second display on the front frame.

* * * * *